M. R. BERRY.
AUTOMATIC MECHANISM FOR CONTROLLING ELECTRIC CUT-OUTS.
APPLICATION FILED JUNE 19, 1913.
1,203,552.
Patented Oct. 31, 1916.
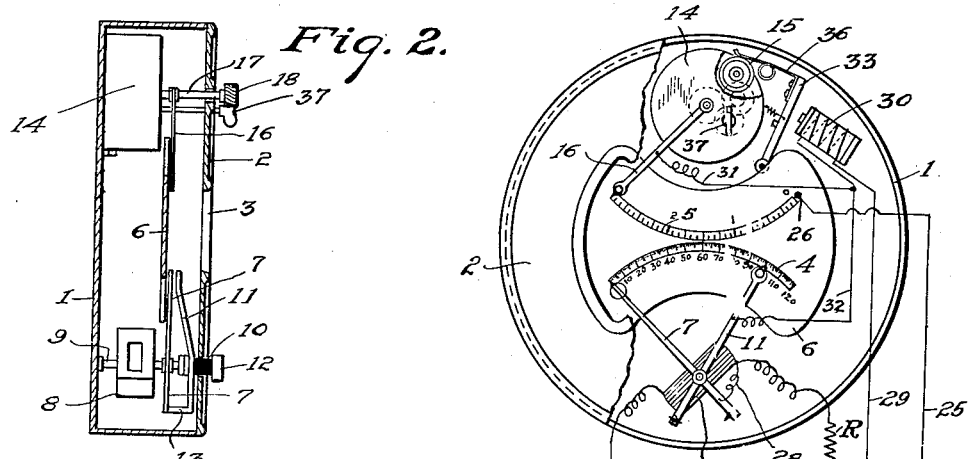
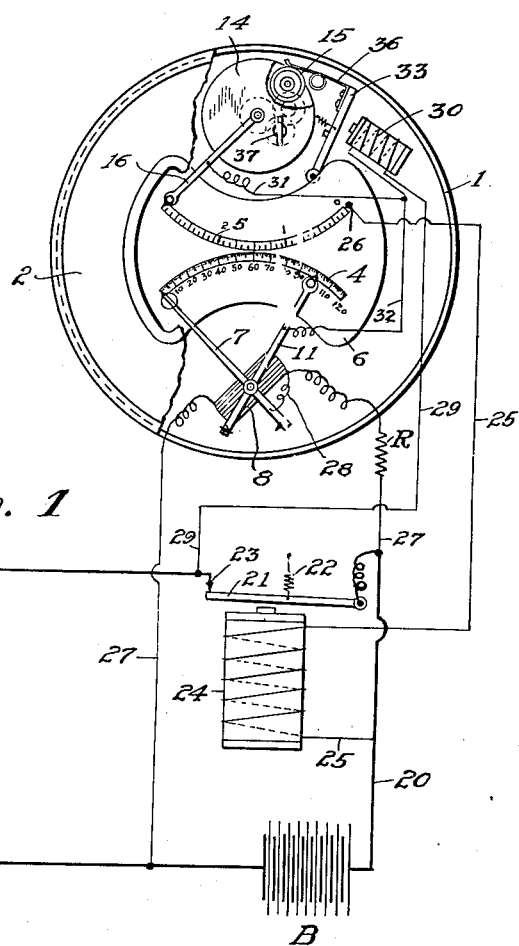
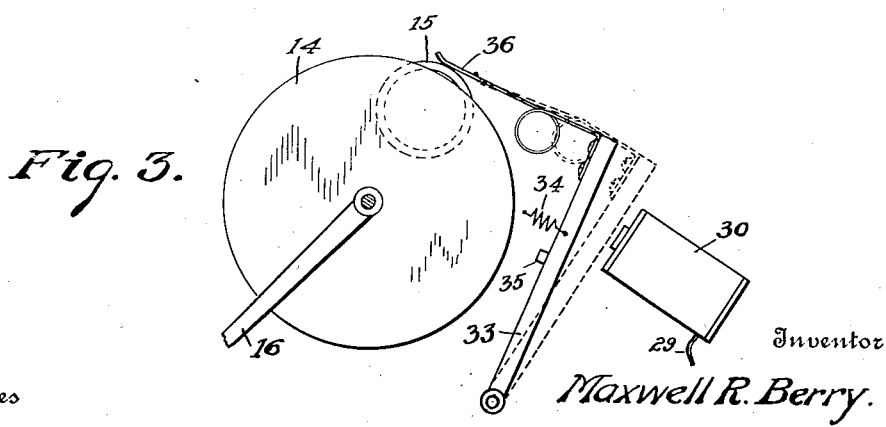
Witnesses
Wm. C. Crickett
norris Welsh.
Inventor
Maxwell R. Berry.
By Robt. A. Johnston
Attorney

UNITED STATES PATENT OFFICE.

MAXWELL R. BERRY, OF MENTOR, OHIO, ASSIGNOR TO ELECTRIC PRODUCTS COMPANY, OF CLEVELAND, OHIO, A CORPORATION OF OHIO.

AUTOMATIC MECHANISM FOR CONTROLLING ELECTRIC CUT-OUTS.

1,203,552.  Specification of Letters Patent.  Patented Oct. 31, 1916.

Application filed June 19, 1913. Serial No. 774,720.

*To all whom it may concern:*

Be it known that I, MAXWELL R. BERRY, a citizen of the United States of America, residing at Mentor, in the county of Cuyahoga and State of Ohio, have invented certain new and useful Improvements in Automatic Mechanism for Controlling Electric Cut-Outs, of which the following is a specification.

My invention relates to automatic mechanism for controlling the supply of electric current to a work circuit and is especially adapted for use in connection with the charging of batteries. Its object is to prolong the flow of current for a predetermined length of time after the electrical conditions set up in the work circuit would otherwise operate to automatically interrupt the current, thereby giving to batteries the desired amount of overcharging.

Broadly speaking, my invention consists in combining with a current measuring instrument and mechanism controlled thereby for automatically interrupting the charging circuit under predetermined electrical conditions therein, a clock controlled mechanism which retards or prevents the going into effect of said circuit interrupting mechanism for the period of time for which the mechanism is set.

According to the preferred embodiment of my invention, I utilize a volt meter having two pointers, one of which is set by hand at the voltage at which it is desired to start the soaking charge for the batteries. When the batteries' voltage rises to the predetermined point the two pointers will engage and close an auxiliary circuit at the meter, starting a clock mechanism which moves a set pointer over a time scale until it engages a contact point and closes a circuit which opens a cut out switch in the charging circuit. When the time pointer is moved out of engagement with the contact point, the circuit controlling the cut out switch is held open. The closing of the auxiliary circuit at the meter will start the clock work and its pointer having been adjusted for the duration of the soaking charge desired, it follows that it will prevent the cut out switch opening the charging circuit for such length of time. This permits me to automatically charge the batteries in a most desirable manner to obtain the best results therefrom, it being well known that a certain soaking charge is always required to get the best results in charging batteries.

My invention comprises the details of construction and arrangement of parts which are hereinafter more particularly described and claimed, reference being had to the accompanying drawings which illustrate the preferred embodiment of my invention, and in which:—

Figure 1 is a front elevation of my improved instrument which I term a soakometer with its front face partly broken away to show its mechanism connected up with a diagrammatic lay out of the circuits. Fig. 2 is a vertical sectional view through the soakometer showing the clock work and meter coil in side elevation, but eliminating the wiring. Fig. 3 is an enlarged detail view illustrating the mechanism for starting and stopping the clock mechanism which actuates the time pointer of the soakometer.

Similar reference numerals refer to similar parts throughout the drawings.

The soakometer is provided with a casing 1 having a front 2 provided with a central glass covered opening 3 through which is displayed a double scale, the lower scale 4 being subdivided to indicate voltage, in the type of indicating volt meter shown, upper scale 5 being subdivided for indicating time preferably in five minutes intervals. These two scales are preferably mounted on a common scale plate 6 which is suitably mounted in the soakometer casing. The movable elements of an ordinary indicating volt meter are formally illustrated as they form no part of this invention. They comprise the pointer 7 and coil 8 mounted on an arbor 9 which at its front end is seated in an insulated sleeve 10 which has mounted thereon a pointer 11 spaced from the pointer 7. This sleeve 10 projects through the front face of the casing and has a knurled screw 12 thereon so that the pointer 11 may be set by hand over the scale 4. At its lower end the pointer 11 is bent to form a contact 13 which will engage the lower end of the pointer 7 when the two pointers are in eclipse. In the upper portion of the casing I mount a clock mechanism 14, having its escapement wheel 15 exposed so as to be engaged by a starting and stop mechanism hereinafter described. A pointer 16, which is driven by the clock mechanism, is mounted on a stem 17 which projects through the front of the casing and is provided with a knurled screw 18, by means of which the pointer 16 may be set to any desired location over the time scale 5.

The main charging circuit for the battery B comprises line wires 19 and 20 leading from the generator G. I provide a cut out for the charging circuit comprising a switch arm 21 connected at one end to wire 20 and held by a spring 22 against contact 23, thereby normally holding the circuit to the battery closed. This switch arm 21 is the armature of a magnet 24 in an auxiliary circuit 25 leading from the main 20 to a contact post 26 at the extreme right hand end of the time scale 5. The meter coil 8 is in a meter shunt circuit 27 across the mains and a branch 28 of this circuit is connected to the pointer 7. The meter controlled auxiliary circuit 29 leads from the main 20 in advance of the cut out switch and after passing through the high resistance windings of a magnet 30, it branches, one part 31 thereof being connected to the time pointer 16 and the other branch 32, which is connected to the meter pointer 11, being normally open circuited there until that pointer is in eclipse with pointer 7 when the circuit is closed to the meter shunt circuit. The resistances R and 30, in the two parallel branch circuits which become energized when the pointers eclipse, prevent a short circuiting of either of these branch circuits. The magnet 30, when energized, acts to attract its pivoted armature 33, which is normally held by a spring 34 against a stop pin 35. This arm carries a flat spring 36 having a loop or bend therein and adapted at its outer end to rest frictionally on the rim of the escapement wheel 15 of the clock mechanism and to press thereon sufficiently to stop the operation of the clock mechanism.

The stem 37, which projects through the front face of the soakometer, is used to wind the clock mechanism.

In operation, after the batteries have been suitably connected up to the charging mains, the knurled screw 12 is grasped and the pointer 11 set at the voltage which is to constitute the full charge point of the battery. The knurled screw 18 is then turned to set pointer 16 over the scale 5 to the point corresponding to the length of time for which it is desired to give the battery an overcharge or soaking charge. As shown, this pointer 16 is set to give the battery a three hours' soaking charge. When the charging has begun, the magnets 24 and 30 being deënergized, the armature 33 stands with its spring 36 engaging the escapement wheel 15 and thus holds the clock mechanism against movement. As the charging continues, the meter pointer 7 advances across its dial until it eclipses with the pointer 11 and thereupon the contacts at the lower ends of the pointers engage and the current is thrown across the small magnet 30, causing it to jerk the armature 33 toward it and in doing so, to move the spring 36 so as to give a definite thrust to the escapement wheel 15 for starting the clock mechanism. It will be noted that the spring 36 stands clear of the escapement wheel when the magnet is energized. The clock mechanism thereupon commences to advance pointer 16 toward the contact 26 and when said pointer and contact engage, current is thrown across the magnet 24 of the circuit breaker which draws down the armature 21 and opens the main charging circuit.

Any source of electrical energy may be substituted for the generator G and any other suitable form of electrically controlled mechanism which will operate as a circuit breaker may be substituted for the magnet and armature shown. Also any suitable form of indicating electrical meter may be used, provided it is equipped with a set pointer or contact device equivalent to 11 and circuit connections which, but for the time controlled retarding mechanism employed, would open the charging circuit when the meter pointer engages the set pointer or contact. The clock mechanism is not illustrated in detail as any suitable escapement control mechanism may be employed. The means shown for starting and stopping the clock mechanism are those which I consider preferable for the purposes I have in view, but they may be modified without departing from the spirit of my invention. Also it is preferable, but not essential, that the time control mechanism be embodied in the same instrument with the current meter.

My invention is shown with the control circuits normally open circuits and adapted to function in the manner described when such control circuits are closed, but it will be understood that such method of wiring is merely preferable and it may be variously modified to secure the same operative results without departing from my invention. When I refer to "clock mechanism" I intend thereby to include a mechanism capable of being set or adjusted to run for a predetermined length of time.

While I regard my invention as peculiarly applicable to the charging of batteries, yet I do not wish to limit its use exclusively to that field.

What I claim as new and desire to secure by Letters Patent, is:—

1. In an electrical apparatus of the character described, a consumption circuit, an indicating electric meter for said consumption circuit, a circuit breaker for said circuit, a clock mechanism, means controlled by said meter to start said clock mechanism, and means controlled by said clock mechanism for operating said circuit breaker.

2. In combination, a charging circuit, a meter therefor, a circuit breaker switch for said circuit, means controlled by said meter and adapted to open said switch under predetermined conditions, and clock controlled means to retard the action of the meter controlled means and hold said switch closed for a predetermined length of time after the meter responds to the predetermined conditions.

3. In an apparatus of the character described, a main supply circuit, an electrically controlled circuit breaker therein, an electric meter connected up with said main circuit, a clock mechanism, means controlled by said meter and adapted under predetermined conditions to start said clock mechanism, and means controlled by the clock mechanism after a predetermined interval to open said circuit breaker, substantially as described.

4. In an apparatus of the character described, a main supply circuit, an electrically controlled circuit breaker therein, an electrical meter connected up with said main circuit, a clock mechanism, electrically controlled means adapted to stop and start said clock mechanism, means controlled by said meter and adapted, under predetermined conditions, to start the clock, and means controlled by the clock mechanism at a predetermined point in its travel which opens the circuit breaker, substantially as described.

5. In an apparatus of the character described, a main supply circuit, an electrically controlled circuit breaker therein, an electrical meter connected up with said main circuit, a clock mechanism, electrically controlled means adapted to stop and start said clock mechanism, means controlled by said meter and adapted, under predetermined conditions, to start the clock, and means controlled by the clock mechanism at a predetermined point in its travel which opens the circuit breaker, said electrical clock control means being adapted to automatically stop the clock when the main circuit is broken.

6. In an apparatus of the character described, a main supply circuit, an electric meter for said main circuit, said meter comprising an electrically controlled movable pointer and an adjustable set pointer with which said movable pointer is adapted to contact at a predetermined point in its travel, a circuit closed by the contact of said pointers, mechanism controlled by the closing of said latter circuit and comprising a clock mechanism and means to start said mechanism, a circuit breaker for said main circuit, and means controlled by the clock mechanism at a predetermined point in its travel to open said circuit breaker, substantially as described.

7. In combination, main supply leads, an electrical circuit breaker therein, a meter connected up to said circuit and having a set pointer and an electrically controlled movable pointer, said movable pointer being adapted to engage and be stopped by said set pointer, an auxiliary circuit comprising contacts closed by said pointers when in a predetermined relative position, an electromagnet in said auxiliary circuit, an armature for the magnet, a clock mechanism, means controlled by said armature and adapted to start said clock mechanism when the magnet is energized and to stop it when the magnet is deënergized, a pointer operated by the clock mechanism, a time scale over which said pointer can be adjusted and set by hand, an auxiliary circuit which controls the operation of said circuit breaker, and a contact in said circuit adapted to be closed by the clock actuated pointer, said latter circuit being closed and the circuit breaker operated to open the main circuit when the meter pointers and the clock pointer have closed the contacts they respectively control, substantialy as described.

8. An instrument of the character described comprising an electric meter having a scale, a movable and a set pointer adjustable relatively to said scale, a time scale, a set pointer movable over said scale, a clock mechanism for actuating said latter pointer, electrically controlled mechanism for starting and stopping the clock mechanism, electrical means controlled by the electric meter pointers and adapted on their engagement to start said clock mechanism to moving said time pointer, a circuit comprising contacts adapted to be closed by all three pointers under predetermined conditions, an electrically controlled circuit breaker which is controlled by and opens responsive to the flow of current through said latter circuit, and a main supply circuit which said circuit breaker controls, substantially as described.

9. In an instrument for controlling the charging of batteries, a current meter having a movable pointer and a set pointer, contacts which points are adapted to close when in predetermined relative position, a current measuring scale over which said pointers are movable, a clock mechanism, an adjustable pointer driven by said clock mechanism, a time scale over which said pointer moves, a contact engaged by said pointer at the end of its clock-actuated travel over said scale, a circuit closed by the meter pointers, mechanism movable responsive to the flow of current through said circuit for frictionally engaging the clock mechanism to start or stop it, a circuit closed by the contacting of the clock driven pointer and its contact, an electric circuit breaker controlled by the energization of said latter circuit, and a main charging circuit which, together with said clock controlled circuit, is adapted to be broken by said circuit breaker, substantially as described.

10. In an apparatus of the character described comprising a main circuit and a circuit breaker and an electric meter therefor, means to automatically control the opening of said circuit breaker comprising a clock mechanism having an escapement wheel, a spring movable to frictionally engage said wheel and start or stop it, means for moving the spring which is controlled by said meter, and means controlled by said clock mechanism for operating the circuit breaker.

11. In an apparatus of the character described comprising a main circuit and a meter and circuit breaker therefor, means for automatically controlling the operation of said circuit breaker comprising a clock mechanism having an escapement wheel, a movable member, a spring movable with said member and adapted in one position to frictionally engage and stop said wheel and in another operating position to release the wheel, said spring being adapted as it moves to its released position to start said wheel by friction, mechanism controlled by the meter under predetermined conditions to actuate said movable member, and means controlled by said clock mechanism to operate said circuit breaker, substantially as described.

In testimony whereof I affix my signature in presence of two witnesses.

MAXWELL R. BERRY.

Witnesses:
 A. R. MEYER,
 ALBERT HAAS.